US007656933B2

(12) United States Patent
Klinke et al.

(10) Patent No.: US 7,656,933 B2
(45) Date of Patent: Feb. 2, 2010

(54) METHOD AND DEVICE FOR THE SUPPRESSION OF PERIODIC INTERFERENCE SIGNALS

(75) Inventors: Stefano Ambrosius Klinke, Kerpen (DE); Christoph Pörschmann, Gladbeck (DE)

(73) Assignee: Siemens Aktiengesellschaft, Munich (DE)

( * ) Notice: Subject to any disclaimer, the term of this patent is extended or adjusted under 35 U.S.C. 154(b) by 475 days.

(21) Appl. No.: 10/499,764

(22) PCT Filed: Nov. 18, 2002

(86) PCT No.: PCT/DE02/04244

§ 371 (c)(1), (2), (4) Date: Jun. 21, 2004

(87) PCT Pub. No.: WO03/052746

PCT Pub. Date: Jun. 26, 2003

(65) Prior Publication Data

US 2005/0096002 A1 May 5, 2005

(30) Foreign Application Priority Data

Dec. 19, 2001 (DE) ................................ 101 62 559

(51) Int. Cl.
*H04B 1/00* (2006.01)

(52) U.S. Cl. ........................ 375/144; 375/148; 375/254; 375/285; 375/346; 455/63.1; 455/297; 455/570

(58) Field of Classification Search ................. 375/254, 375/285, 345–347, 340, 144, 146, 148, 256, 375/306, 316, 354; 455/24, 63, 67.3, 456, 455/306, 570, 63.1, 70, 297, 501

See application file for complete search history.

(56) References Cited

U.S. PATENT DOCUMENTS

| | | | |
|---|---|---|---|
| 5,742,694 A | 4/1998 | Eatwell | |
| 5,903,819 A | 5/1999 | Romesburg | |
| 6,320,968 B1 | 11/2001 | Linder | |
| 6,510,308 B1 * | 1/2003 | Thomas et al. | 455/63.1 |
| 6,957,052 B2 * | 10/2005 | Kuehn | 455/114.3 |
| 7,031,402 B2 * | 4/2006 | Takada | 375/296 |
| 7,567,638 B2 * | 7/2009 | Kolze et al. | 375/346 |
| 2005/0180492 A1 * | 8/2005 | Dent | 375/144 |

OTHER PUBLICATIONS

Meir Feder, "*Parameter Estimation and Extraction of Helicopter Signals Observed with a Wide-Band Interference*", IEEE Transactions on Signal Processing, Jan. 1993, vol. 41, No. 1, pp. 232-244.

* cited by examiner

*Primary Examiner*—Shuwang Liu
*Assistant Examiner*—Hirdepal Singh
(74) *Attorney, Agent, or Firm*—King & Spalding L.L.P.

(57) ABSTRACT

A method and device are provided for suppressing periodic interference signals, including a unit which is used to provide a period length for the periodic interference signal, an interference detection unit for detecting a signal corresponding to the interference signal, and a subtraction unit for subtracting the signal corresponding to the interference signal. The interference detection unit carries out multiple superpositioning of the input signal and scales the multiple superpositioned input signal depending on the period length of the interference signal in order to detect the signal corresponding to the interference signal.

49 Claims, 4 Drawing Sheets

METHOD AND DEVICE FOR THE SUPPRESSION OF PERIODIC INTERFERENCE SIGNALS

BACKGROUND OF THE INVENTION

The present invention relates to a method and a device for suppressing essentially periodic interference signals, and in particular to a method and a device for suppressing periodic interference in the audio frequency range, which is caused, for example, by a digital telecommunications system during the transmission of data, and acts, for example, on a mobile telecommunications terminal or an external device such as, for example, a hearing aid.

In a large number of digital telecommunications systems, data is transmitted between a mobile telecommunications terminal such as, for example, a mobile telephone, and an associated base station by way of a pulsed radio frequency signal with a predetermined carrier frequency. For what is referred to as a GSM telecommunications system (Global System for Mobile Communications), the carrier frequency is 900 MHz and a pulse frequency is approximately 217 Hz. In contrast, in the case of a Digital Enhanced Cordless Telecommunications (DECT) system the carrier frequency is 1800 MHz and the associated pulse frequency is 100 Hz. A further standard which is based on GSM is the DCS1800 standard which also operates at 1800 MHz. In digital telecommunications systems, a large number of carrier frequencies with different pulse frequencies are therefore used, for which reason the manufacturers of terminals are increasingly developing what are referred to as dual-band or triple-band terminals for implementing the various standards.

In particular, the pulsed radio frequency signal causes problems in this context. The pulsed radio frequency signal is demodulated, for example, by the nonlinear FET characteristic curve of a microphone which is present in the terminal, and in doing so gives rise to interference in the audio frequency range, some of which is clearly perceptible.

FIG. 1 shows a simplified representation over time of a signal which has been subjected to periodic interference such as is output, for example, at the output of a signal source such as, for example, a microphone, which has been subjected to interference by a pulsed radio frequency signal.

FIG. 2 shows a simplified representation over time of the associated pulsed radio frequency signal or periodic interference signal such as occurs, for example, in GSM or DECT telecommunications systems. According to FIG. 2, in the GSM standard, radio frequency pulses which contain the actual information are transmitted at a time interval T of approximately 4.7 milliseconds. In the DECT standard, this time interval T is 10 milliseconds and corresponds to a frequency of 100 Hz in contrast to 217 Hz in the case of GSM. These periodic interference signals can then act on a printed circuit board, and in particular on a signal source such as, for example, a microphone, resulting in the interference peaks represented in FIG. 1.

Conventional devices and methods for suppressing these periodic interference signals are essentially based on shielding the radio interference by way of, for example, a conductive shielding housing of the signal source or a conductive microphone housing. It is necessary to ensure here that the housing is enclosed as completely as possible. An optimum effect is usually achieved by way of a metallic shield. However, such a shield is costly and takes up a lot of space, in particular in devices such as, for example, a mobile telecommunications terminal and/or a hearing aid.

A further possible way of suppressing these periodic interference signals is to eliminate the line-bound interference by way of filtering.

In this context, interference-suppression capacitors are used which are typically mounted spatially close to the field-effect transistor (FET) of the microphone in order to attenuate the periodic radio frequency interference signal there as much as possible. The selection of the capacitor is particularly critical here since the influence of parasitic inductances increases greatly at high frequencies.

Consequently, an optimum interference suppression is achieved only with a capacitor whose impedance is minimal for the respective frequency of the interference signal. However, a disadvantage here is that such signal sources or microphones which are tuned using capacitors cost significantly more than conventional standard electret microphones. In addition, a new signal source or microphone has to be developed for each new telecommunications terminal or mobile telephone model or else each type of hearing aid, since the hardware environment such as, for example, the printed circuit board layout of the terminal or of the hearing aid, influences the properties of the interference-suppression capacitor. A further disadvantage consists in the fact that a respective interference-suppression capacitor is required for each carrier frequency so that signal sources with two interference-suppression capacitors are necessary for a dual-band device, and signal sources with even three interference-suppression capacitors are necessary for a triple-band device.

The present invention is therefore directed toward a method and a device for suppressing essentially periodic interference signals, permitting simplified and improved interference suppression.

SUMMARY OF THE INVENTION

Accordingly, by way of a multiple superposition of the input signal which is carried out as a function of the period length of the interference signal, and subsequent scaling of the multiply superpositioned input signal, it is possible for a signal which corresponds to the interference signal to be determined particularly easily, an input signal on which interference suppression has been very well performed being obtained via a subsequently carried-out subtraction of the signal corresponding to the interference signal from the input signal which has been subjected to interference. Such a method is easy to implement and also requires very little computing power. In addition there are no delays in the input signal such as, for example, an audio signal.

The input signal is preferably buffered as a digitized signal over a number of period lengths, superpositioning being very easy to implement as a function of the period length.

The signal which corresponds to the interference signal is preferably determined by mean value formation over a predetermined or changing number of periods, which is made possible without difficulty in a software implementation.

In addition, different weighting factors can be superpositioned on the input signal. In particular, a sliding mean value formation can be applied, as a result of which particularly high-value interference signal suppression is obtained. The weighting factors may be defined as a function of the input signal here, as a result of which further qualitative improvement of the interference suppression is obtained, even independently of a respective input signal level or ratio with respect to the interference signal.

A division is preferably used for scaling, further scaling methods also being conceivable in order to move the superpositioned input signal back into its original amplitude range.

When there is unknown periodic interference, the period length can also be determined from the input signal which has been subjected to interference, in particular an autocorrelation of a section of the input signal which has been subjected to interference being carried out in order to determine maximum values, and the period length subsequently being determined from a time interval between the maximum values. In this way, unknown periodic interference signals also can be sensed and suppressed automatically. In the same way, interference signals which essentially have only a uniform period length and consequently can have small fluctuations also can be sensed and suppressed.

It is preferably the case in the method that an input signal which has directly been subjected to interference is not used for interference suppression, but rather an error signal which is dependent thereon, a signal analysis being carried out in order to output the error signal and associated coefficients on the basis of a useful signal which has been subjected to interference, and a signal synthesis then being carried out in order to recover a useful signal on which interference suppression has been performed, on the basis of an error signal on which interference suppression has been performed, and the coefficients.

During the signal analysis, FIR filtering is preferably carried out in order to output a predictive error signal and associated predictor coefficients on the basis of a speech signal, and during the signal synthesis IIR filtering is carried out in order to recover the useful signal on which interference suppression has been performed, on the basis of a predictive error signal, on which interference suppression has been performed, and the predictor coefficients. As a result, the speech estimators which are used in any case during the coding of speech in digital telecommunications systems advantageously can be used for suppressing the periodic interference signals further. In the same way, such elements which are known from speech coding and speech estimation also can be used in external devices such as, for example, hearing aids, thus permitting further miniaturization with further suppression of interference, in particular in comparison with the periodic interference signals which are generated by digital transmission systems.

The particular advantage results, in particular, from the fact that after the signal analysis has been carried out, only the error signal contains the periodic interference, while the associated coefficients remain unaffected.

During signal analysis, linear prediction and, in particular, short-term prediction are preferably carried out in a time range of 20 to 400 milliseconds. Such linear short-time predictors permit sufficiently precise error signals and coefficients for further signal processing to be generated. In order to determine the respective coefficients it is appropriate here, in particular, to use what is referred to as the Levinson-Durbin algorithm since it is customarily used, in particular, for speech coding in mobile terminals and is thus available in any case.

The subtraction is preferably carried out as a function of signal energy of the input signal which has been subjected to interference and of the input signal on which interference suppression has been performed. In this way, even such interference signals which do not have an interference signal in each frame or after each period length T, but rather jump over one period length, for example, can be eliminated. Such irregular absence of interference signals within the period length often results from the telecommunications standards used, so that even such absence of interference signals does not cause any undesired degradation of the interference suppression.

The method for suppressing periodic interference signals which has been explained above is preferably carried out in a pause in speech of the input signal which has been subjected to interference, and in particular a second step in which the signal which corresponds to the interference signal is determined should be determined in a pause in speech. This has the advantage that in order to determine the signal corresponding to the interference signal it is possible to average over a comparatively small number of period lengths, since the useful data component is absent in a pause in speech. However, the main advantage is that comb filter effects can be effectively avoided.

A pause in speech in the input signal which has been subjected to interference basically can be detected in any desired fashion. However, the following methods are preferably applied individually or in combination with one another: a pause in speech can be detected by way of energy in a current period length of the input signal. Alternatively, a pause in speech can be detected by way of a maximum value in a current period length of the input signal. As a further alternative, it is conceivable for a pause in speech to be detected by way of a change in the input signal in a current period length in comparison with a preceding period length.

These methods are based on the fact that, when a useful signal is present, it is basically highly likely that there will be energy in a current period length and also a maximum value in a current period length. With respect to detecting pauses in speech by way of a change in the input signal from period length to period length, reference is made to the fact that, of course, the input signal within a pause in speech usually differs significantly from the input signal during a speech transmission.

In a preferred embodiment, an input signal with reduced interference also can be used as an input signal, this procedure having the advantage that it is easier to distinguish between the presence and the absence of a pause in speech, specifically in cases in which the useful signal is of low intensity.

If it is detected that the signal which corresponds to the interference signal has been determined on the basis of period lengths during which, erroneously, there was no pause in speech, it is possible, in order to carry out a third step, to have recourse to earlier values of the signal corresponding to the interference signal, the device which is provided for carrying out the method having, for this purpose, a suitable memory for the earlier values of the signal corresponding to the interference signal.

Additional features and advantages of the present invention are described in, and will be apparent from, the following Detailed Description of the Invention and the Figures.

DETAILED DESCRIPTION OF THE INVENTION

First Exemplary Embodiment

Figure 3:
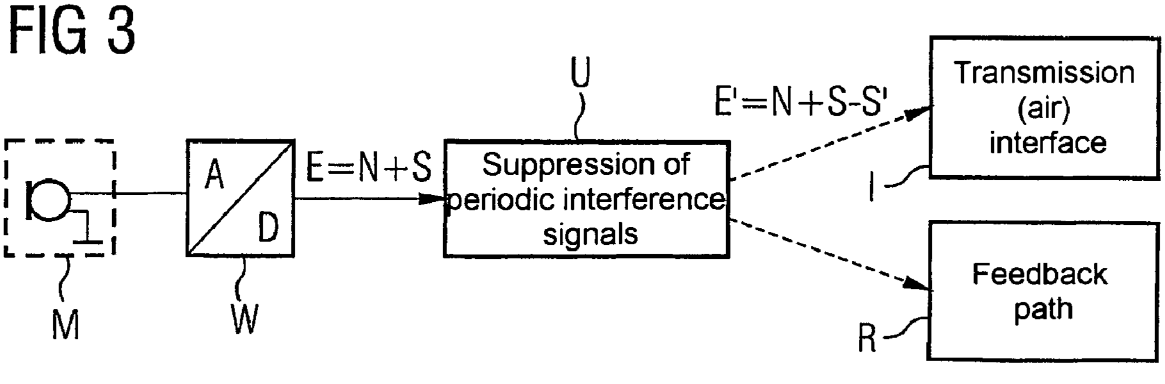
FIG. 3 shows a simplified block representation of an overall system with the interference-suppression device according to a first exemplary embodiment.

FIG. 3 shows a simplified block circuit diagram of a system configuration in which the interference-suppression device according to the present invention can be used, for example. According to FIG. 3, M designates a signal source or a microphone for converting an acoustic speech signal into an electrical speech signal or useful signal. As has already been described above, an interference signal S can be superpositioned on an actual speech useful signal N owing to interference signals acting, for example via the printed circuit board or via radio interference, as a result of which an input signal E which has been subjected to interference is produced. Such superpositioning of a periodic interference signal on a useful signal is generally known, the humming caused by the mains being a typical example.

However, as has already been described at the beginning, such interference can also occur in digital telecommunications devices or in devices which are used in the direct vicinity of these terminals, in which case the periodic interference signal is caused by the transmission of data between the mobile telecommunications terminal and the associated base station. In order to suppress such periodic interference signals, it is possible for the known measures which are described at the beginning to be carried out, for example the provision of shielding of the signal source M and/or the provision of an interference signal pre-filter which usually has an interference-suppression capacitor and is also suitable for reducing the periodic interference signal in the input signal E which has been subjected to interference. The initially analog input signal which has been subjected to interference is converted by an analog/digital converter W into a digitized input signal E which has been subjected to interference, and then fed to the actual interference signal-suppression device U which generates, by subtracting a signal S' (which corresponds to the interference signal) from the input signal E which has been subjected to interference, an input signal E' on which interference suppression has been performed and which is, for example, transmitted via an air interface I or fed back via a feedback path R to a headset/loudspeaker (not illustrated) in order to produce a necessary echo.

Figure 4:
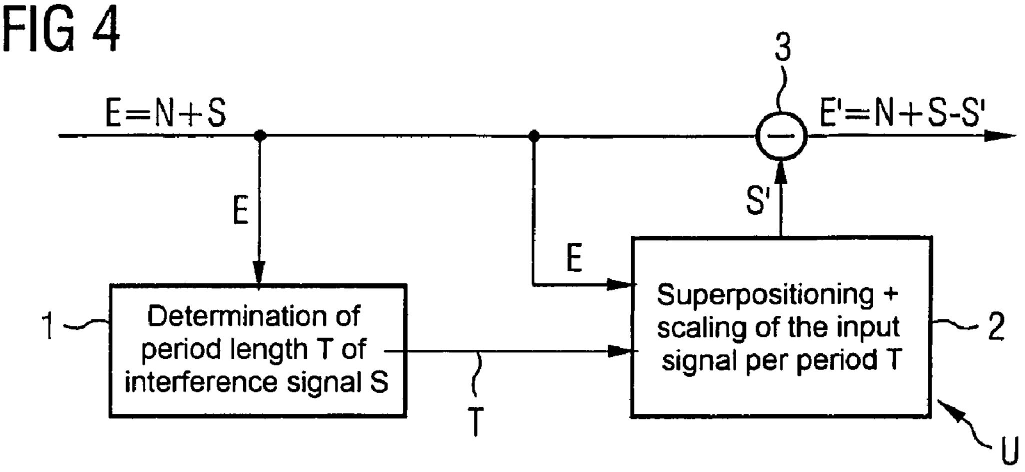
FIG. 4 shows a simplified block representation of the interference-suppression device.

FIG. 4 shows a simplified block diagram of the interference signal-suppression device U according to FIG. 3. According to FIG. 4, the digitized input signal E which has been output by the converter W and has been subjected to interference and which is composed of the useful signal N and the periodic interference signal S is fed, for example, to a period length-determining unit 1 which determines a period length T of the interference signal S. Such an identification of the period length T of the interference signal S can be carried out in different ways. However, signal maximum values are preferably determined via autocorrelation in a section of the input signal E or of an audio signal which has been subjected to interference (for example, shortly after the telephone link is set up or at occasional intervals during the call), and the period length T of the interference signal S is determined directly from the time intervals between the signal maximum values of the autocorrelation function. Such determination of the period length accordingly may take place once or at chronologically predetermined intervals.

If, as for example in pauses in speech, a speech signal is not transmitted, it is alternatively possible to determine the period length directly between two maximum values of the interference signal or the input signal which has been subjected to interference, as a result of which the period length T is determined particularly easily.

Alternatively, the period length-determining unit 1 can be implemented by a period length-provision unit (not illustrated) which, for example when an existing periodic interference signal is known, outputs the period length T of such signal.

In an interference signal-determining unit 2, a signal S' which corresponds to the interference signal S is then determined and subsequently subtracted from the input signal E which has been subjected to interference, by way of a subtraction unit 3, as a result of which the input signal E'=N+S−S' (which essentially corresponds to the useful signal N) is then subtracted, by the subtraction unit 3, from the input signal E which has been subjected to interference.

In order to determine the signal S' which corresponds to the interference signal S, according to FIG. 4 multiple superpositioning on the input signal E and subsequent scaling of the multiply superpositioned input signal are carried out in the interference signal-determining unit 2 as a function of the period length T of the periodic interference signal S.

Multiple superpositioning on the input signal E is consequently carried out in the interference signal-determining unit 2 at the time interval of the period length T, as a result of which the interference signals which are each located at the same place are increasingly amplified and the statistically distributed useful signal or audio signal N is increasingly eliminated. After scaling, which corresponds, for example, to a division corresponding to the number of superpositioning processes carried out, a signal S' which corresponds to the input signal E which has been subjected to interference and which is essentially identical to the interference signal S in the input signal is, in turn, obtained. The subtraction which is carried out in the subtractor 3 consequently provides an input signal E' on which interference suppression has been performed and which substantially corresponds to the useful signal or audio signal N.

Averaging is preferably carried out over a series of phases or frames of the periodic interference signal. Since it is not possible to form mean values over an infinitely long time period, formation of mean values takes place, for example, over a predetermined or changing finite number of periods or period lengths T. In order to improve the quality of interference suppression which has been carried out, it has proven appropriate to introduce what are referred to as weighting factors, in which case periods which are further in the past are to be weighted less strongly than a respectively present period or current period in order to obtain a weighted mean value.

A sliding formation of mean values in the interference signal-determining unit 2 is preferably carried out according to the following scheme:

$$\text{mean value}_n = a \times \text{mean value}_{n-1} + (1-a) \times \text{mean value}_{current},$$

n being the number of respective periods or frames and a describing a weighting factor.

In this context, the weighting factor "a" can be permanently selected between 0 and 1. For a weighting factor of a=0.8 and sliding mean value formation over 2 period lengths T, the following values are obtained:

$$\text{mean value}_0 = 0.2 \times \text{input signal}_0$$

$$\text{mean value}_1 = \text{current} = 0.2 \times \text{input signal}_1 = \text{current} + 0.8 \times (0.2 \times \text{input signal}_0)$$

etc.

This produces, by way of the mean value, a signal S' which corresponds very closely to the interference signal S and which subsequently can be subtracted from the input signal.

A different possibility is to vary this weighting factor "a", i.e., to configure the system adaptively. It is appropriate here to average over a relatively long time period if there is superpositioning on the interference signal by a speaker, for example. To be more precise, the weighting factor "a" can be selected to be large as a function of the input signal or as a function of the latter's signal level (volume). On the other hand, it is possible to select the weighting factor "a" to be smaller, for example in pauses in speech when, for example, the signal level of the useful signal or audio signal N is very small. In this case, the current phase or the frame or period of the interference signal is weighted more strongly.

This signal which is determined in the interference signal-determining unit 2, or the nonweighted mean value S', is subsequently subtracted from the input signal (audio signal) in the current frame or the instantaneous period length, as a result of which the interference signal S can be strongly reduced. If the mean value contains the entire fraction of the period interference signal, it is removed from the input signal completely by computation.

The quality of the interference-suppression device also can be improved by subtraction as a function of signal energy of the input signal which has been subjected to interference, and of the input signal E' on which interference suppression has been performed. In this context, the subtractor 3 is extended by the following estimate:

If signal energy of the input signal E' on which interference suppression has been performed is increased in the frame or the period under consideration by subtraction of the signal S' (which corresponds to the interference signal S) from the input signal E, the subtraction is dispensed with or the subtraction is carried out with a weighting factor "b" (less than 1). Increasing the signal energy of the input signal E' (on which interference suppression has been performed) in comparison with the input signal E (which has been subjected to interference) by way of the subtraction indicates, in fact, that the interference signal has (unexpectedly) not occurred in the frame under consideration and as a result the interference suppression would be degraded by the subtraction. Since such failure of the periodic interference signal to occur is not unusual, for example in DECT telecommunications systems, and occurs at more or less regular intervals, such dependent subtraction with possibly adaptive subtraction weighting factors "b" brings about a further improvement in quality.

Figure 1:
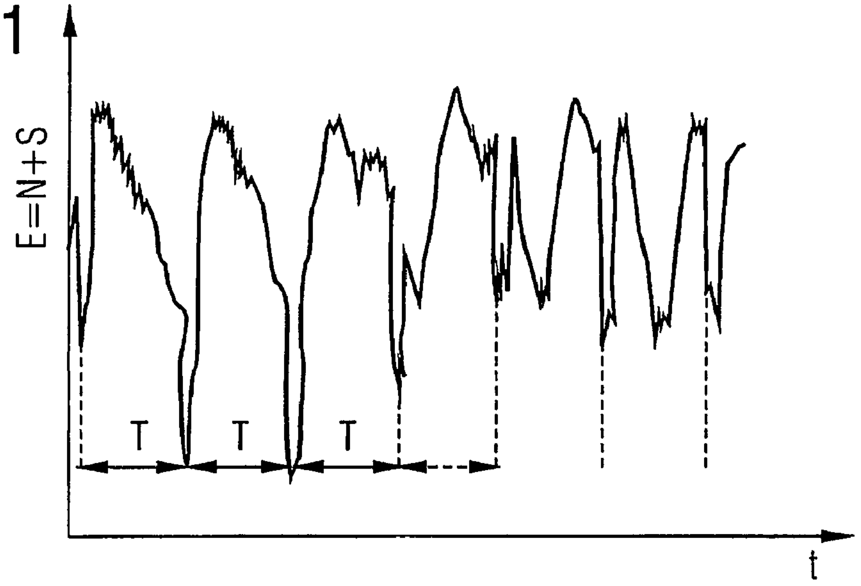
FIG. 1 shows a simplified representation over time of a signal which has been generated by a signal source and has been subjected to periodic interference.
Figure 2:
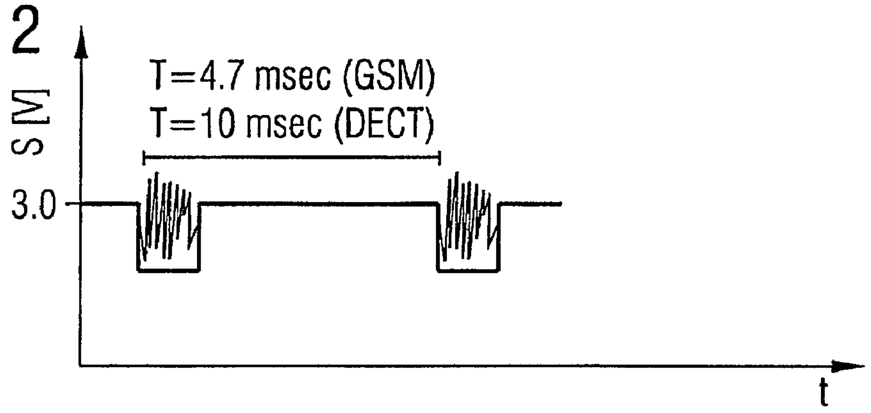
FIG. 2 shows a simplified representation over time of the periodic interference signal.
Figure 5:
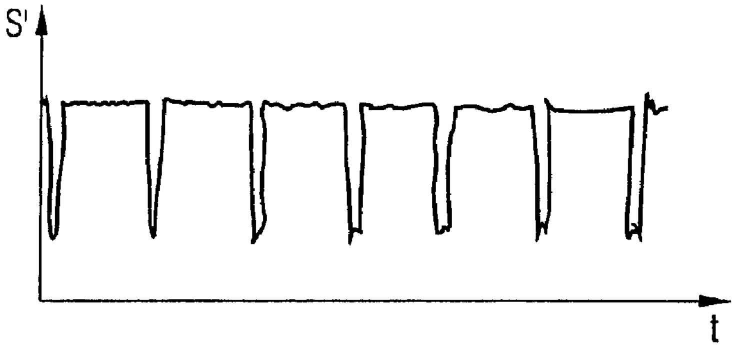
FIG. 5 shows a simplified representation over time of the signal which is generated in the interference-suppression device and corresponds to the interference signal.

FIG. 5 shows a simplified representation over time of the signal S' which has been determined by the interference signal-determining unit 2 and which corresponds essentially to the interference signal S and is subtracted from the input signal according to FIG. 1. In this way, a method and a device for suppressing periodic interference signals are obtained, as a result of which metallic screening, for example of the microphones, can be dispensed with. As a result, the costs for the microphones and signal sources can be lowered. In addition, when the input signals or audio signals are conducted on a printed circuit board it is no longer necessary to consider radio frequency interference, as a result of which the layout can be significantly simplified, and a microphone position can be selected more freely. In addition, the method described above can be implemented very easily and requires only very low computing power since essentially only two additions and multiplications per sampled value are necessary. The method also prevents any additional delays in the audio signal from occurring.

The input signal is preferably stored as a digitized signal over a number of period lengths T in a buffer (not illustrated), as a result of which further processing, and in particular the superpositioning or mean value formation described above can be implemented particularly easily.

According to the first exemplary embodiment, the method described above has been applied directly to the input signal E or the audio signal data. However, it also can be equally applied to error signals or residue signals such as occur, for example, during speech estimation.

Second Exemplary Embodiment

Figure 6:
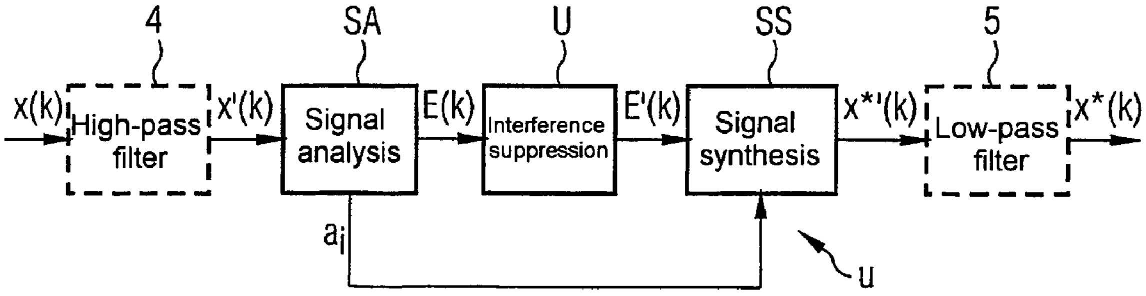
FIG. 6 shows a simplified block representation of a subsystem with the interference-suppression device according to a second exemplary embodiment.

FIG. 6 shows a simplified block diagram of a subsystem with the interference-suppression device according to a second exemplary embodiment. In order to simplify the following description, it is firstly assumed that the optional blocks 4 and 5 are not present in FIG. 6, and the useful signal which has been subjected to interference is therefore x(k)=x'(k). In the same way it is true that: x*'(k)=x*(k).

The device for suppressing periodic interference signals according to the second exemplary embodiment is essentially composed of a signal analyzer SA for outputting an error signal E(k) and associated coefficients $a_i$ on the basis of the useful signal which has been subjected to interference or an electrical speech signal which has been subjected to interference. On the basis of the error signal E(k) which has been output by the signal analyzer SA, the interference signal-suppression device U which has been described above then, in turn, generates an error signal E'(k) on which error suppression has been performed, which has reduced periodic interference signals and which is passed on to a signal synthesizer SS. The signal synthesizer SS carries out, on the basis of the error signal E'(k) on which interference suppression has been performed and the coefficients $a_i$ which have been generated by the signal analyzer SA, a signal synthesis in order to recover a useful signal x*(k) or x*'(k) on which interference suppression has been performed. The useful signal quality of the useful signal x*(k) on which interference suppression has been performed can, accordingly, be improved further.

The interference-suppression device U is preferably formed in a mobile telecommunications terminal such as, for example, a mobile telephone, the elements which are illustrated in FIG. 6 being at least already partially present for carrying out speech coding.

In order to reduce a quantity of data as well as susceptibility to faults, what are referred to as speech coders are used, in particular, in wirefree telecommunications systems, such coders improving a signal quality or immunity to faults while taking into account human reception possibilities. In this context, FIR (Finite Impulse Response) filters or IIR filters are used as what are referred to as speech estimators in order to output a predictive error signal and associated predictor coefficients on the basis of a respective speech signal. According to the present invention, the signal analyzer SA can then use such an FIR filter for outputting a predictive error signal E(k) and associated predictor coefficients $a_i$ on the basis of the respective speech signal x(k) which has been subjected to interference. Accordingly, the method which is applied by the interference-suppression device U is then not applied directly to the input signal E or the audio signal but rather to an associated error signal or residue signal. In this context, it is possible to use, for example, a linear predictor for carrying out a linear prediction as a signal analyzer SA, a short-term prediction being preferably carried out in a time range of 20 to 400 milliseconds. Such linear short-term predictors (preferably the so-called Levinson-Durbin algorithm being used to calculate the predictor coefficients $a_i$) are again generally known in speech coding, for which reason a detailed description is dispensed with below.

The signal analyzer SA accordingly generates an error signal E(k) which has been subjected to interference, as well as associated coefficients $a_i$ which do not contain any interference.

According to FIG. 6, the actual interference suppression of the periodic interference signal is then carried out in the signal-suppression device U described above.

The error signal E(k) generated by the signal analyzer SA is basically composed of the difference between the useful signal x(k) which has been subjected to interference and an associated estimated value $\hat{x}(k)$, i.e. $e(k)=x(k)-\hat{x}(k)$. The error signal E'(k) which has been improved or on which interference suppression has been performed then is at least partially synthesized in conjunction with the coefficients $a_i$, as a result of which the useful signal or original signal x*(k) on which interference suppression has been performed is obtained.

According to FIG. 6, in order to improve the calculation of coefficients in the signal analyzer SA, a high-pass filter 4 for additional high-pass filtering of the useful signal x(k) which has been subjected to interference and for generating a useful signal x'(k) which has been filtered but is still being subjected to interference also can be used at the input end. What is referred to as a pre-emphasis filter, which brings about a further improvement in conjunction with the signal analyzers used from speech coding, is generally used as high-pass filter 4. In order to compensate the high-pass filter 4 which has been introduced as an option, it is also possible to use, as an option, a low-pass filter 5 at the output end for low-pass filtering of the useful signal x*'(k) on which interference suppression has been performed, the low-pass filter 5 ultimately outputting the useful signal x*(k) on which interference suppression has been performed. Such a low-pass filter is usually composed of what is referred to as a de-emphasis filter.

In the same way, according to FIG. 6, the known interference-suppression prefilters and shielding of the signal source M again can be optionally added to the described interference signal-suppression device, this then resulting in the use of cost-effective electret microphones. The interference-suppression capacitors would have to be connected directly to the terminal pins of the signal source or of the microphone M in this context. The advantage of the second exemplary embodiment which is described above is the fact that possible artifacts in the useful signal, which may arise owing to conventional noise reduction, can be attenuated significantly through signal analysis and signal synthesis.

Third Exemplary Embodiment

Figure 7:
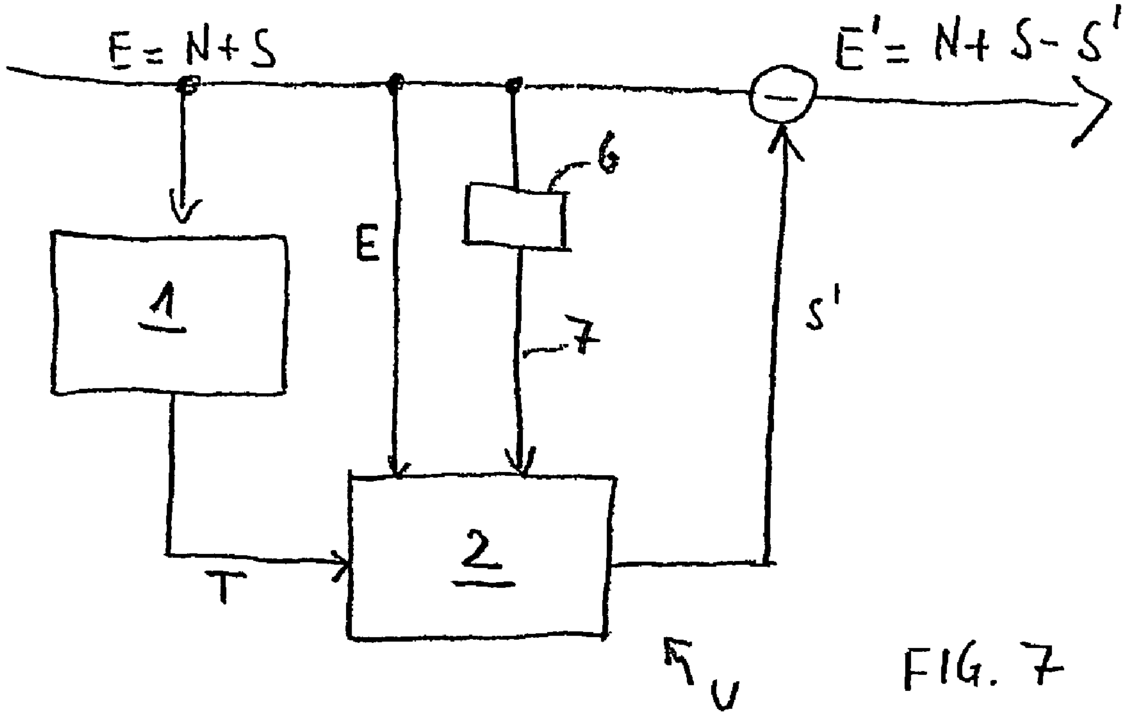
FIG. 7 shows a simplified block representation of the interference-suppression device, combined with a pause-in-speech sensing device, according to a third exemplary embodiment.

A third exemplary embodiment of the present invention which is illustrated in FIG. 7, is extended in comparison with the exemplary embodiment illustrated in FIG. 4 by providing a device 6 for detecting pauses in speech, the input signal E which has been subjected to interference being connected to its input. The device for detecting pauses in speech determines, by reference to features of the input signal E which has been subjected to interference, whether there is currently a pause in speech, or speech useful signals are being transmitted in a current time frame/a current time period T of the input signal E which has been subjected to interference.

The device 6 for detecting pauses in speech is connected via a control line 7 to the interference signal-determining unit 2 so that the interference signal-determining unit 2 is continuously informed whether or not there is currently a pause in speech.

As in the embodiment according to FIG. 4, the input signal E which has been subjected to interference is also directly present at the interference signal-determining unit 2. The mean value which is formed by the interference signal-determining unit is then updated in the way described above only if the device 6 for detecting pauses in speech indicates the presence of a pause in speech via the control line 7.

The features which the device 6 for detecting pauses in speech uses to determine the presence of a pause in speech include, for example, a maximum signal value in a current period length T or the total energy of the input signal E which has been subjected to interference, within one period length T. A comparison between current signal profiles of the input signal E which has been subjected to interference with earlier signal profiles from previous period lengths also can be used to determine whether there is such a deviation between the signal profiles that it can be concluded that there is a pause in speech.

Since the useful signal for detecting the signal S' which corresponds to the interference signal S is, as it were, "disruptive," the detection within one pause in speech has the advantage that the signal S' can be determined more quickly with sufficient quality, since fewer averaging steps are necessary. Comb filter effects are also avoided.

Fourth Exemplary Embodiment

Figure 8:
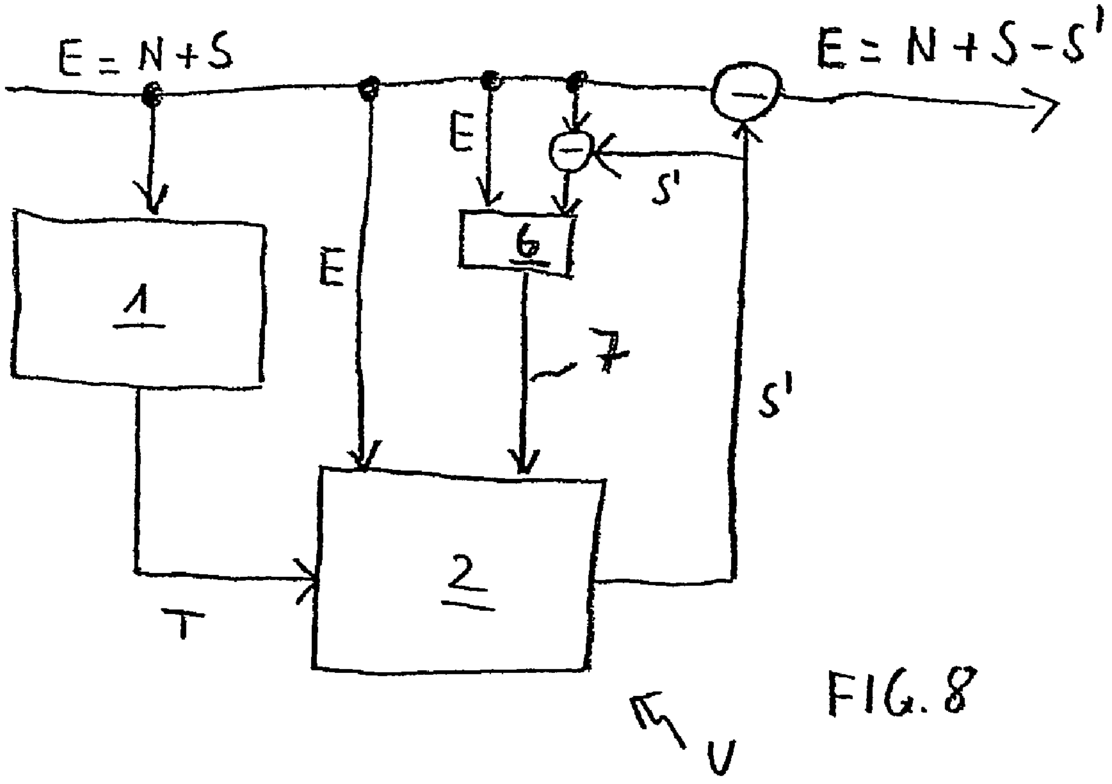
FIG. 8 shows a simplified block representation of the interference-suppression device, combined with a pause-in-speech sensing device, according to a fourth exemplary embodiment.

The fourth exemplary embodiment of the present invention, which is shown in FIG. 8, differs from the exemplary embodiment according to FIG. 7 in that the device 6 for detecting pauses in speech has a further input, at which the input signal E is present with reduced interference. For this purpose, the signal S' which corresponds to the interference signal S is fed to a second subtractor 8 at whose input the input signal which has been subjected to interference is present, and at whose output a signal with reduced interference, which is fed to the device 6 for detecting pauses in speech, is present. However, it is to be noted here that the input signal with reduced interference, which is present at the second input of the device 6 for detecting pauses in speech, is based, in terms of its reduction of interference, on a mean value for the signal S' which is obtained from preceding time periods T with respect to the current input signal E which has been subjected to interference.

The exemplary embodiment according to FIG. 8 makes it possible to determine pauses in speech both by using the input signal E which has been subjected to interference, and on the basis of the signal which has reduced interference and which is present at the second input of the device 6 for detecting pauses in speech. If the interference component in the input signal E which has been subjected to interference is, in fact, very large it may be difficult to detect the presence of a pause in speech solely on the basis of the input signal E which has been subjected to interference. In this case, it is appropriate to perform a detection of pauses in speech on the basis of the input signal with reduced interference. In another case, when the interference signal S is subjected to very severe fluctuations in intensity or is not present over a time period, it is more favorable to carry out the detection of pauses in speech solely on the basis of the input signal E which has been subjected to interference.

In the exemplary embodiment from FIG. 8 it is thus possible, depending on the signal position, to decide in particular on a ratio between the interference signal S and useful signal N or, on the basis of other criteria, to decide whether a detection of pauses in speech is to be performed by using only the input signal E which has been subjected to interference, the signal with reduced interference, or both. Such a decision can be taken in the device 6 for detecting pauses in speech, using comparisons between the input signal E (which has been subjected to interference) for successive period lengths T.

Fifth Exemplary Embodiment

Figure 9:
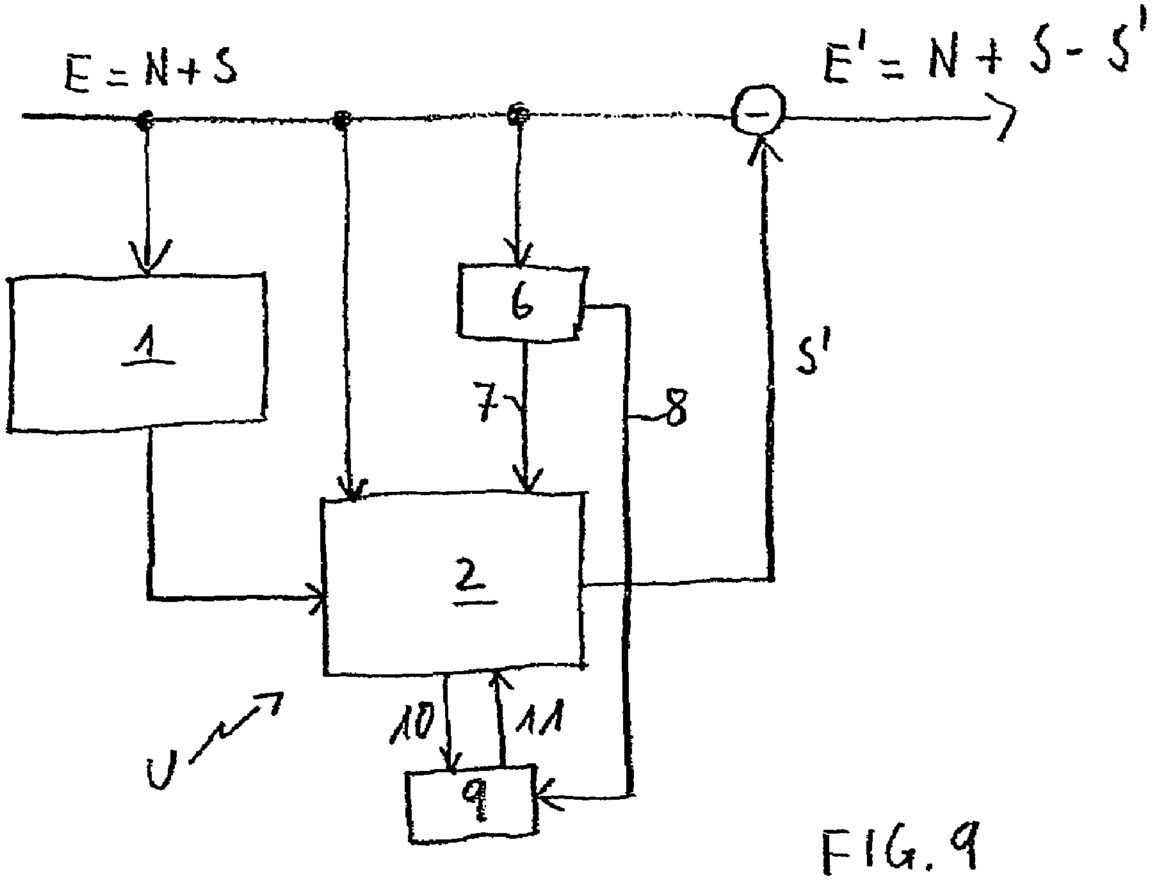
FIG. 9 shows a simplified block representation of the interference-suppression device, combined with a pause-in-speech sensing device, according to a fifth exemplary embodiment.

A fifth exemplary embodiment of the present invention, which is illustrated in FIG. 9, generally based on the exemplary embodiment according to FIG. 7. However, the device 6 for detecting pauses in speech is connected via a control line 8 to a memory 9 which contains earlier values for the signal S'.

If, for example, it is determined that the device 6 for detecting pauses in speech is operating incorrectly owing to a transition from a pause in speech to a speech-transmitting period, it is possible, using the memory 9, to have recourse to the earlier values for the signal S' which corresponds to the interference signal S. In this respect, it is subsequently possible, by exchanging errored values for S' which are acquired through the mean value formation, to find a more favorable value for the signal S' which is fed to the subtractor 3 by way of earlier values which originate from a pause in speech.

For this purpose, values for the signal S' which originate in a uniquely defined way from pauses in speech are copied into the memory 9 via a signal line 10, the presence of uniquely defined values for a pause in speech being transmitted via the signal line 8.

The earlier values are copied via a signal line 11 to the interference signal-determining unit 2 in order to exchange errored values which have arisen, for example, from a transition from a pause in speech to a speech-transmitting period.

Sixth Exemplary Embodiment

According to a sixth exemplary embodiment, the device according to the present invention or the associated method is not integrated into a system which generates the periodic interference signal but is instead implemented as an external device. Such external devices may constitute, in particular, what are referred to as hearing aids, since they are usually employed in the direct vicinity of a respective mobile telecommunications terminal and are thus particularly subject to interference from periodic interference signals described above. To be more precise, the interference signal-suppression device described above with direct or indirect application to the input signal is accordingly implemented in a hearing aid which may constitute, for example, a behind-the-ear device (HdO), an in-the-ear device (IdO), an in-the-canal device (complete in the canal, CIC), a pocket device, a headset and/or an implant. In turn, it is possible to implement hearing aids which are improved in this way which are essentially insensitive to the periodic interference signals generated by digital telecommunications systems.

The present invention has been described above by way of periodic interference signals in the GSM and DECT telecommunications systems. However, it is not restricted thereto and includes interference signals which are periodic in the same way and which are generated by other wirefree or wirebound telecommunications systems or other systems. In the same way, the present invention is not restricted to mobile telecommunications terminals and hearing aids, but also includes in the same way other devices which are particularly subject to such periodic interference signals.

Although the present invention has been described with reference to specific embodiments, those of skill in the art will recognize that changes may be made thereto without departing from the spirit and scope of the present invention as set forth in the hereafter appended claims.

The invention claimed is:

1. A method for suppressing periodic interference signals in an input audio signal which has been subjected to interference, the method comprising:

determining a period length for a substantially periodic interference signal in the input audio signal;

using the determined interference period length to generate a multiple-superposition signal by:

identifying a particular time period of the input audio signal having a duration equal to the determined interference period length;

superimposing the particular time period onto multiple previous time periods of the input signal, each having a duration equal to the determined interference period length, wherein the multiple superpositioning processes results in an increased amplification of interference signals located at the same place, and further results in an increased removal of useful signals from the input audio signal;

obtaining a further signal by scaling the generated multiple-superposition signal, wherein the further signal corresponds to the substantially periodic interference signal; and subtracting the further signal from the input audio signal which has been subjected to interference in order to generate a further input audio signal on which interference suppression has been performed.

2. The method as claimed in claim 1, wherein the input audio signal is buffered as a digitized signal over a plurality of period lengths.

3. The method as claimed in claim 1, wherein a mean value formation is carried out over one of a predetermined and changing number of period lengths.

4. The method as claimed in claim 1, wherein the superpositioning on the input audio signal is carried out with different weighting factors.

5. The method as claimed in claim 4, wherein a sliding mean value formation is carried out.

6. The method as claimed in claim 4, wherein the weighting factors are defined as a function of the input audio signal.

7. The method as claimed in claim 1, comprising scaling the multiple-superposition signal based on the number of previous time periods used to generate the multiple-superposition signal.

8. The method as claimed in claim 1, wherein, in the step of determining a period length, the period length is determined from the input audio signal which has been subjected to interference.

9. The method as claimed in claim 8, wherein, in the step of determining a period length, an autocorrelation of a section of the input audio signal which has been subjected to interference is carried out in order to determine maximum values, and the period length is determined from a time interval between the maximum values.

10. The method as claimed in claim 1, wherein the input audio signal constitutes one of an input audio signal which has been directly subjected to interference and an error signal which is dependent thereon.

11. The method as claimed in claim 10, further comprising the steps of:

carrying out a signal analysis in order to output the error signal and associated coefficients based on a useful signal which has been subjected to interference; and carrying out a signal synthesis in order to recover a further useful signal on which interference suppression has been performed, based on a further error signal on which interference suppression has been performed and the associated coefficients.

12. The method as claimed in claim 11, wherein during the signal analysis, at least one of Finite Impulse Response (FIR) filtering and Infinite Impulse Response (IIR) filtering are carried out in order to output a predictive error signal and associated predictor coefficients based on a voice signal, and at least one of the signal synthesis, FIR filtering and IIR filtering are carried out in order to recover the further useful signal on which interference suppression has been performed, based on a further predictive error signal on which interference suppression has been performed and the predictor coefficients.

13. The method as claimed in claim 11, wherein a linear prediction is carried out during the signal analysis.

14. The method as claimed in claim 13, wherein the linear prediction includes a short-term prediction in a time range of 20 to 400 milliseconds.

15. The method as claimed in claim 11, wherein during the signal analysis, coefficients are determined via a Levinson-Durbin algorithm.

16. The method as claimed in claim 1, wherein the step of subtracting the further signal is carried out as a function of signal energy of the input audio signal which has been subjected to interference and of the further input audio signal on which interference suppression has been performed.

17. The method as claimed in claim 1, wherein the method is carried out in a wireless telecommunications terminal.

18. The method as claimed in claim 1, wherein the method is carried out in a hearing aid.

19. The method as claimed in claim 1, wherein the periodic interference signal is at least one of a GSM signal and a DECT signal.

20. The method as claimed in claim 1, wherein the further signal which corresponds to the interference signal is determined in a pause in speech in the input audio signal which has been subjected to interference.

21. The method as claimed in claim 20, wherein the pause in speech is detected via energy in a current period length of the input audio signal.

22. The method as claimed in claim 20, wherein the pause in speech is detected via a maximum value in a current period length of the input audio signal.

23. The method as claimed in claim 20, wherein the pause in speech is detected via a change in the input audio signal in a current period length in comparison with a preceding period length.

24. The method as claimed in claim 20, wherein an input audio signal with reduced interference is used as the input audio signal.

25. The method as claimed in claim 1, wherein in order to carry out the step of subtracting the further signal, there is recourse to earlier values of the further signal corresponding to the interference signal.

26. A device for suppressing periodic interference signals in an input audio signal which has been subjected to interference, the device comprising:

a period length-provision unit that determines a period length of a substantially periodic interference signal in the input audio signal;

an interference signal-determining unit that uses the determined period length to generate a multiple-superposition signal by:

identifying a particular time period of the input audio signal having a duration equal to the determined interference period length; and superimposing the particular time period onto multiple previous time periods of the input signal, each having a duration equal to the determined interference period length, wherein the multiple superpositioning processes results in an increased amplification of interference signals located at the same place, and further results in an increased removal of useful signals from the input audio signal, and wherein the interference signal-determining unit obtains a further signal by scaling the generated multiple-superposition signal, wherein the further signal corresponds to the substantially periodic interference signal; and a subtraction unit for subtracting the further signal corresponding to the interference signal, from an input audio signal which has been subjected to interference, and for generating a further input audio signal on which interference suppression has been performed.

27. The device as claimed in claim 26, wherein the interference signal-determining unit includes a buffer for buffering the input audio signal as a digitized signal over a plurality of period lengths.

28. The device as claimed in claim 26, wherein the interference signal-determining unit carries out mean value formation over one of a predetermined and changing number of period lengths.

29. The device as claimed in claim 26, wherein the interference signal-determining unit includes a sliding mean value formation unit with different weighting factors.

30. The device as claimed in claim 26, wherein the scaling is carried out by a division unit in order to implement a ratio of the super position input audio signal with respect to the number of superpositions.

31. The device as claimed in claim 26, further comprising:

a signal analyzer for outputting an error signal as an input audio signal and associated coefficients based on a useful signal which has been subjected to interference; and a signal synthesizer for recovering a further useful signal on which interference suppression has been performed, based on a further error signal on which interference suppression has been performed and the coefficients.

32. The device as claimed in claim 31, wherein the signal analyzer includes at least one of an Finite Impulse Response (FIR) filter and an Infinite Impulse Response (IIR) filter for outputting a predictive error signal and associated predictor coefficients based on a speech signal, and the signal synthesizer includes at least one of an FIR filter and an IIR filter for recovering the further useful signal on which interference suppression has been preformed, based on a further predictive error signal on which interference suppression has been preformed and the associated predictor coefficients.

33. The device as claimed in claim 31, wherein the signal analyzer includes a linear predictor for carrying out a linear prediction.

34. The device as claimed in claim 33, wherein the linear predictor carries out short-term prediction in a time range of 20 to 400 milliseconds.

35. The device as claimed in claim 31, wherein the signal analyzer determines the coefficients via a Levinison-Durbin algorithm.

36. The device as claimed in claim 31, further comprising a high-pass filter for filtering the useful signal which has been subjected to interference suppression, and for improving calculation of coefficients in the signal analyzer.

37. The device as claimed in claim 36, wherein the high-pass filter is a pre-emphasis filter.

38. The device as claimed in claim 36, further comprising a low-pass filter for filtering the further useful signal on which interference suppression has been preformed, and for compensating the high-pass filter.

39. The device as claimed in claim 38, wherein the low-pass filter includes a de-emphasis filter.

40. The device as claimed in claim 31, further comprising an interference signal pre-filter for reducing the periodic interference signal in the useful signal.

41. The device as claimed in claim 26, wherein the useful signal which has been subjected to interference is generated by an electric microphone.

42. The device as claimed in claim 26, wherein the device is formed in a wirefree telecommunications terminal.

43. The device as claimed in claim 26, wherein the device is formed in a hearing aid.

44. The device as claimed in claim 43, wherein the hearing aid is at least one of a behind-the-ear device, an in-the-ear device, an in-the-canal device, a pocket device, a headset and an implant.

45. The device as claimed in claim 26, wherein the periodic interference signal is at least one of a GSM signal and a DECT signal.

46. The device as claimed in claim 26, wherein the periodic length-provision unit includes a period length-determining unit which, in order to determine signal maximum values, carries out an autocorrelation of a section of the input audio signal which has been subjected to interference, and determines the period length from a time interval between the signal maximum values.

47. The device as claimed in claim 26, further comprising a sensing device for a pause in speech in the input audio signal which has been subjected to interference and which interacts with the interference signal-determining unit.

48. The device as claimed in claim 26, further comprising a memory for earlier values for the further signal which corresponds to the interference signal.

49. A device for suppressing periodic interference signals in an input audio signal which has been subjected to interference, the device comprising:

a period length-provision unit that determines a period length of a substantially periodic interference signal in the input audio signal;

an interference signal-determining unit that performs multiple superpositioning processes for a particular period of the input audio signal using the determined period length, by (a) identifying a particular time period of the input audio signal having a duration equal to the determined interference period length, and (b) superimposing the particular time period onto multiple previous time periods of the full input signal, wherein the multiple superpositioning processes results in an increased amplification of interference signals located at the same place, and further results in an increased removal of useful signals from the input audio signal, and wherein the interference signal-determining unit obtains a further signal after scaling the multiple superpositioning processes, wherein the further signal corresponds to the substantially periodic interference signal; and a subtraction unit for subtracting the further signal corresponding to the interference signal, from an input audio signal which has been subjected to interference, and for generating a further input audio signal on which interference suppression has been performed.

* * * * *